US012482613B2

(12) United States Patent
Kuan

(10) Patent No.: US 12,482,613 B2

(45) Date of Patent: Nov. 25, 2025

(54) ELECTROMAGNETIC SWITCH HAVING DISPLAY LIGHT

(71) Applicant: Feng-Yu Kuan, Taichung (TW)

(72) Inventor: Feng-Yu Kuan, Taichung (TW)

(*) Notice: Subject to any disclaimer, the term of this patent is extended or adjusted under 35 U.S.C. 154(b) by 282 days.

(21) Appl. No.: 18/235,893

(22) Filed: Aug. 21, 2023

(65) Prior Publication Data

US 2025/0069824 A1 Feb. 27, 2025

(51) Int. Cl.
*H01H 50/22* (2006.01)
*H01H 9/16* (2006.01)

(52) U.S. Cl.
CPC ............ *H01H 9/161* (2013.01); *H01H 50/22* (2013.01)

(58) Field of Classification Search
CPC ............................... H01H 9/161; H01H 50/22
USPC .......................................................... 335/103
See application file for complete search history.

(56) References Cited

U.S. PATENT DOCUMENTS 1,630,650 A * 5/1927 Bliss ...................... H01H 73/44 335/174
2,050,076 A * 8/1936 Wilms ...................... H02P 1/02 361/33
4,851,624 A * 7/1989 Chestnut .................. B60Q 3/14 200/317
4,868,354 A * 9/1989 Ray .......................... B60Q 3/64 200/17 R
10,056,213 B1 * 8/2018 Kuan ................... H01H 50/641
2015/0270074 A1 * 9/2015 Dobi ...................... G01R 31/69 200/402
2018/0096811 A1 * 4/2018 Lee ...................... H01H 50/026

* cited by examiner

*Primary Examiner* — Shawki S Ismail
*Assistant Examiner* — Lisa N Homza
(74) *Attorney, Agent, or Firm* — Che-Yang Chen

(57) ABSTRACT

An electromagnetic switch having a display light is disclosed. The electromagnetic switch includes a housing; an electromagnetic unit in the housing; a contact unit in the housing; a button unit having a top seat, a power-on button and a power-off button, wherein the top seat is connected to the housing in a snap-fit manner, the power-on button and the power-off button are slidably connected to the top seat, respectively; a display light that is fixedly connected between the top seat and the power-on button and has a circuit board, a light-emitting member, and two conductive wires. The two conductive wires are connected to the contact unit. When the power-on button is pressed to turn on the electricity, the light-emitting member will emit light to remind the operator. When the power supply is not normal, the electromagnetic switch is powered off to remind the operator of abnormal power supply.

16 Claims, 6 Drawing Sheets

ELECTROMAGNETIC SWITCH HAVING DISPLAY LIGHT

BACKGROUND OF THE PRESENT INVENTION

Field of Invention

The present invention relates to an electromagnetic switch, and more particularly to an electromagnetic switch having a display light.

Description of Related Arts

Electromagnetic switches are widely used in the industry as a control interface for users to power on or off a machine.

However, there is no difference in the position and configuration of a conventional electromagnetic switch whether it is in a power-on state or in a power-off state. As a result, it is difficult for the operator to know that the electromagnetic switch is in the power-on state or power-off state directly by looking at the electromagnetic switch, so it is difficult to know that the machine tool is powered on or off at this time. The operator can only observe other parts of the machine, resulting in inconvenience in operation. The operator may make a misjudgment, which may lead to danger.

SUMMARY OF THE PRESENT INVENTION

In view of the shortcomings of the prior art, the primary object of the present invention is to provide an electromagnetic switch having a display light. The electromagnetic switch comprises a housing, an electromagnetic unit, a contact unit, a button unit, and a display light. The housing has an accommodating room with a hollow top. The electromagnetic unit includes a coil seat and an actuating plate. The coil seat is disposed in the accommodating room. The actuating plate is pivotally connected to the coil seat. The actuating plate has a linking end and a magnetic end. The actuating plate is pivoted back and forth by an external force. The contact unit includes a contact seat and at least two electrode sheet assemblies. The contact seat is disposed in the accommodating room. The contact seat has a plurality of movable contacts thereon. The electrode sheet assemblies are respectively located on two sides of the contact seat and extend out of a bottom of the housing. One of the electrode sheet assemblies communicates with the coil seat. The electrode sheet assemblies have a plurality of immovable contacts thereon. The contact seat is against the linking end of the operating plate and slides up and down through the external force. When the contact seat slides upwards, the movable contacts are in contact with the immovable contacts to turn on electricity. When the contact seat slides downwards, the movable contacts are separated from the immovable contacts to turn off electricity. The button unit includes a top seat, a power-on button, and a power-off button. The top seat is connected to the housing in a snap-fit manner. The power-on button is slidably connected to the top seat, so that the power-on button slide up and down relative to the top seat. The power-off button is slidably connected to the top seat, so that the power-off button slides up and down relative to the top seat. When the power-on button is pressed, the contact seat is driven to move up. When the power-off button is pressed, the contact seat is driven to move down. The display light includes a circuit board, a light-emitting member, and two conductive wires. The circuit board is fixedly connected to the top seat and located below the power-on button. The light-emitting member is disposed on the circuit board. The two conductive wires are connected between the circuit board and one of the electrode sheet assemblies. When the power-on button is pressed to turn on the electricity, the light-emitting member will emit light to remind the operator, thereby reducing misjudgment and incorrect operation and reducing the probability of danger.

DETAILED DESCRIPTION OF THE PREFERRED EMBODIMENT

Figure 1:
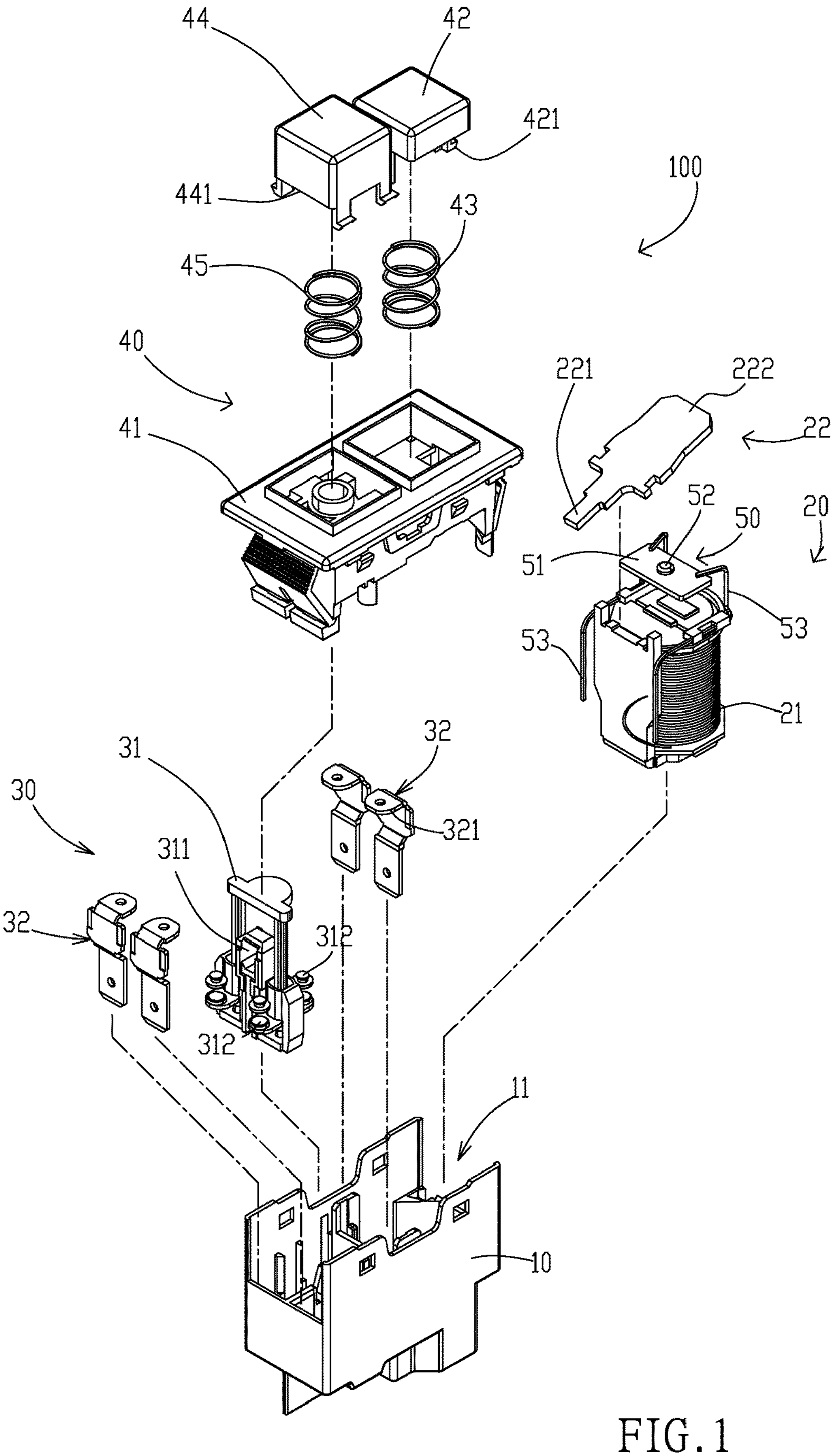
FIG. 1 is an exploded view according to a preferred embodiment of the present invention.
Figure 2:
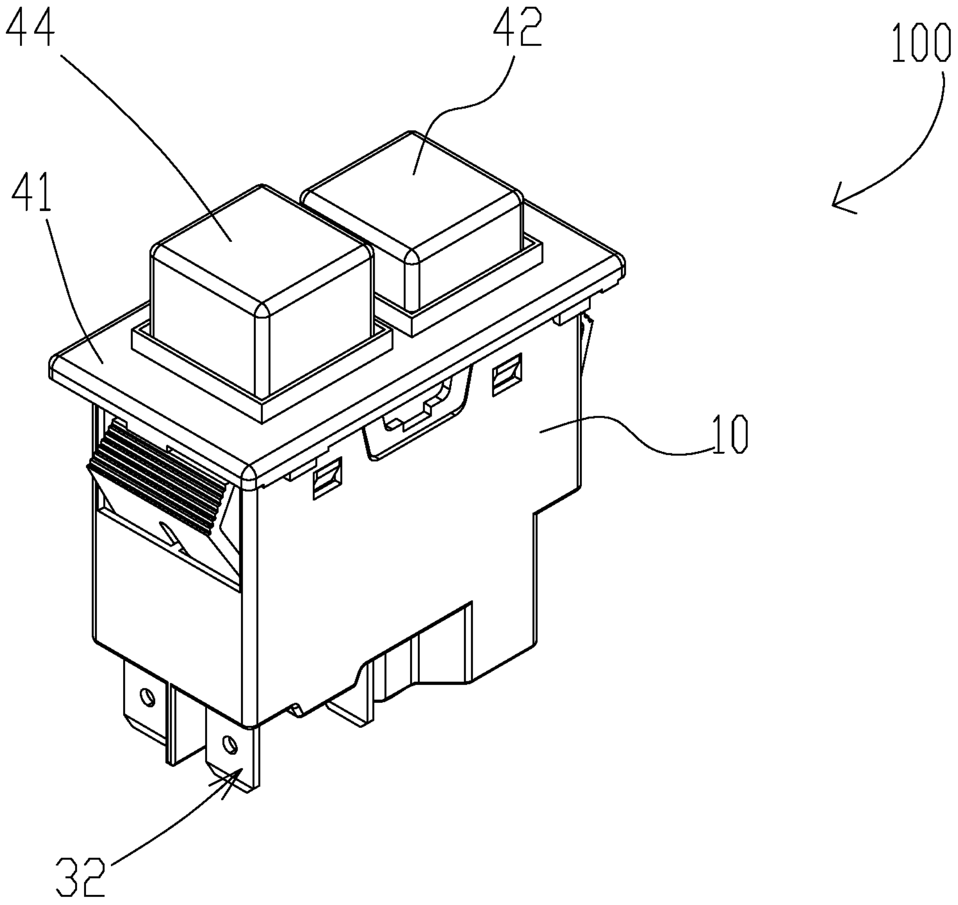
FIG. 2 is a perspective view of FIG. 1.

Embodiments of the present invention will now be described, by way of example only, with reference to the accompanying drawings.

As shown in FIG. 1 through FIG. 5, the present invention discloses an electromagnetic switch 100 having a display light. The electromagnetic switch 100 according to a preferred embodiment of the present invention comprises a housing 10, an electromagnetic unit 20, a contact unit 30, a button unit 40, and a display light 50.

As shown in FIG. 1 through FIG. 5, the housing 10 has an accommodating room 11 with a hollow top.

As shown in FIG. 1 through FIG. 5, the electromagnetic unit 20 includes a coil seat 21 and an actuating plate 22. The coil seat 21 is disposed on one side of the accommodating room 11 of the housing 10. The actuating plate 22 is rotatably pivoted to the coil seat 21. The actuating plate 22 has a linking end 221 and a magnetic end 222. The magnetic end 222 is located above the coil seat 21. The actuating plate 22 is pivotable back and forth between a connection position and a disconnection position under the action of an external force.

As shown in FIG. 1 through FIG. 5, the contact unit 30 includes a contact seat 31 and at least two opposite electrode sheet assemblies 32. The contact seat 31 is disposed on the other side of the accommodating room 11 of the housing 10. The contact seat 31 has a through hole 311 for insertion and contact of the linking end 221 of the actuating plate 22. The contact seat 31 has a plurality of movable contacts 312 thereon. The electrode sheet assemblies 32 are respectively located on two sides of the contact seat 31 and extend out of the bottom of the housing 10. One of the electrode sheet assemblies 32 communicates with the coil seat 21. The electrode sheet assemblies 32 have a plurality of immovable contacts 321 thereon. The contact seat 31 can be reciprocated and slid up and down under the action of the external force. When the contact seat 31 slides upwards, the movable contacts 312 are in contact with the immovable contacts 321. When the contact seat 31 slides downwards, the movable contacts 312 are separated from the immovable contacts 321.

As shown in FIG. 1 through FIG. 5, the button unit 40 includes a top seat 41, a power-on button 42, a power-on button spring 43, a power-off button 44, and a power-off button spring 45. The top seat 41 is connected to the top of the housing 10 in a snap-fit manner. The power-on button 42 has two slide pins 421. The slide pins 421 are slidably connected to the top seat 41, so that the power-on button 42 slides up and down relative to the top seat 41. The power-on button 42 is located above the magnetic end 222 of the actuating plate 22. The power-on button spring 43 is connected between the top seat 41 and the power-on button 42 for providing an upward return elastic force to the power-on button 42, so that the power-on button 42 can be returned and not pressed. The power-off button 44 has four slide pins 441. The slide pins 441 are slidably connected to the top seat 41, so that the power-off button 44 slides up and down relative to the top seat 41. The power-off button 44 is located above the contact seat 31. The power-off button spring 45 is connected between the top seat 41 and the power-off button 44 for providing an upward return elastic force to the power-off button 44.

As shown in FIG. 1 through FIG. 5, the display light 50 includes a circuit board 51, a light-emitting member 52, and two conductive wires 53. The circuit board 51 is fixedly connected to the top seat 41, and is located below the power-on button 42 and separated by an appropriate distance. The light-emitting member 52 is disposed on the top of the circuit board 51. The light-emitting member 52 is an LED or a neon light. The two conductive wires 53 are connected between the circuit board 51 and one of the electrode sheet assemblies 32.

Figure 3:
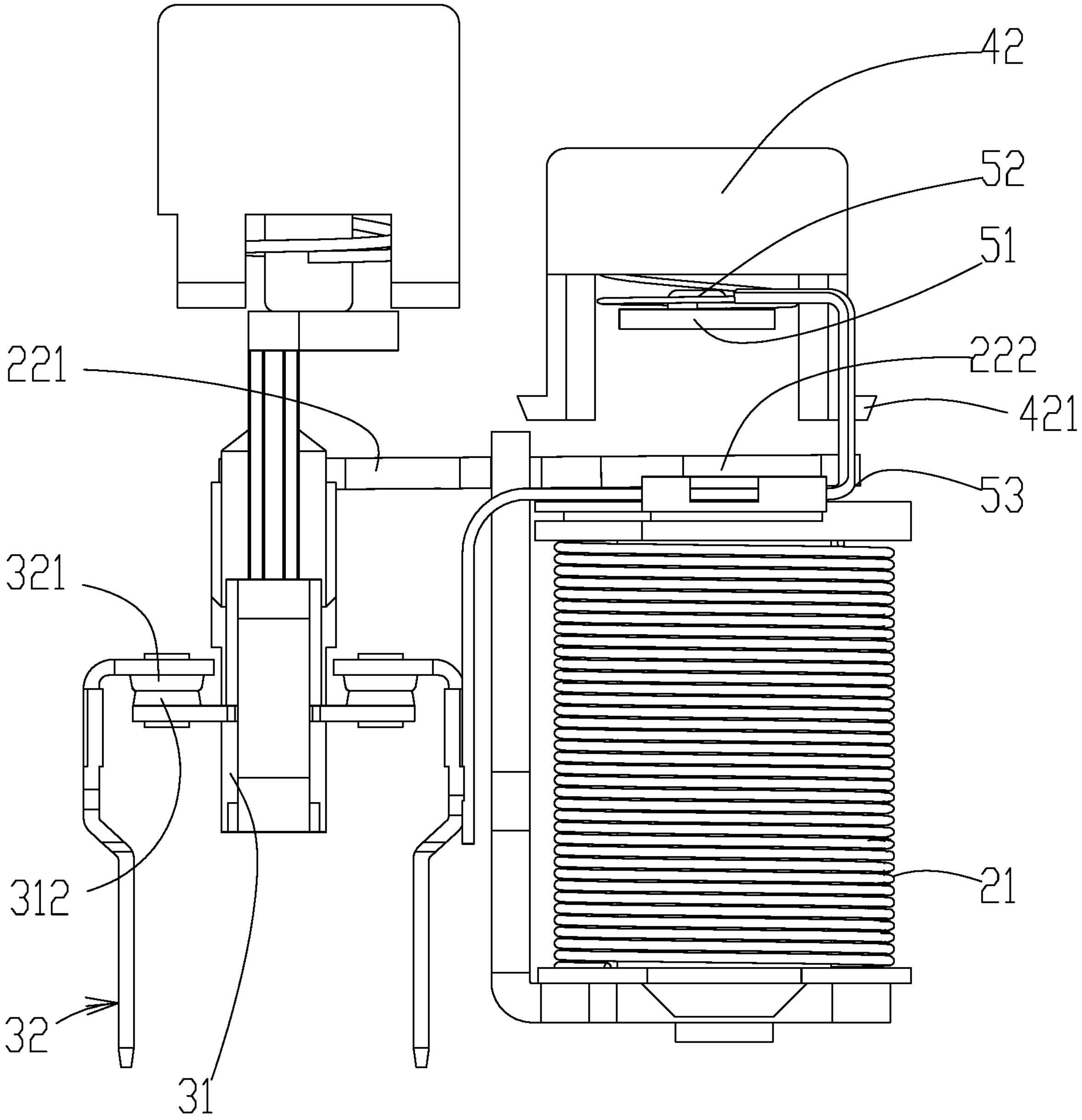
FIG. 3 is a schematic view of FIG. 1 in a power-on state.
Figure 4:
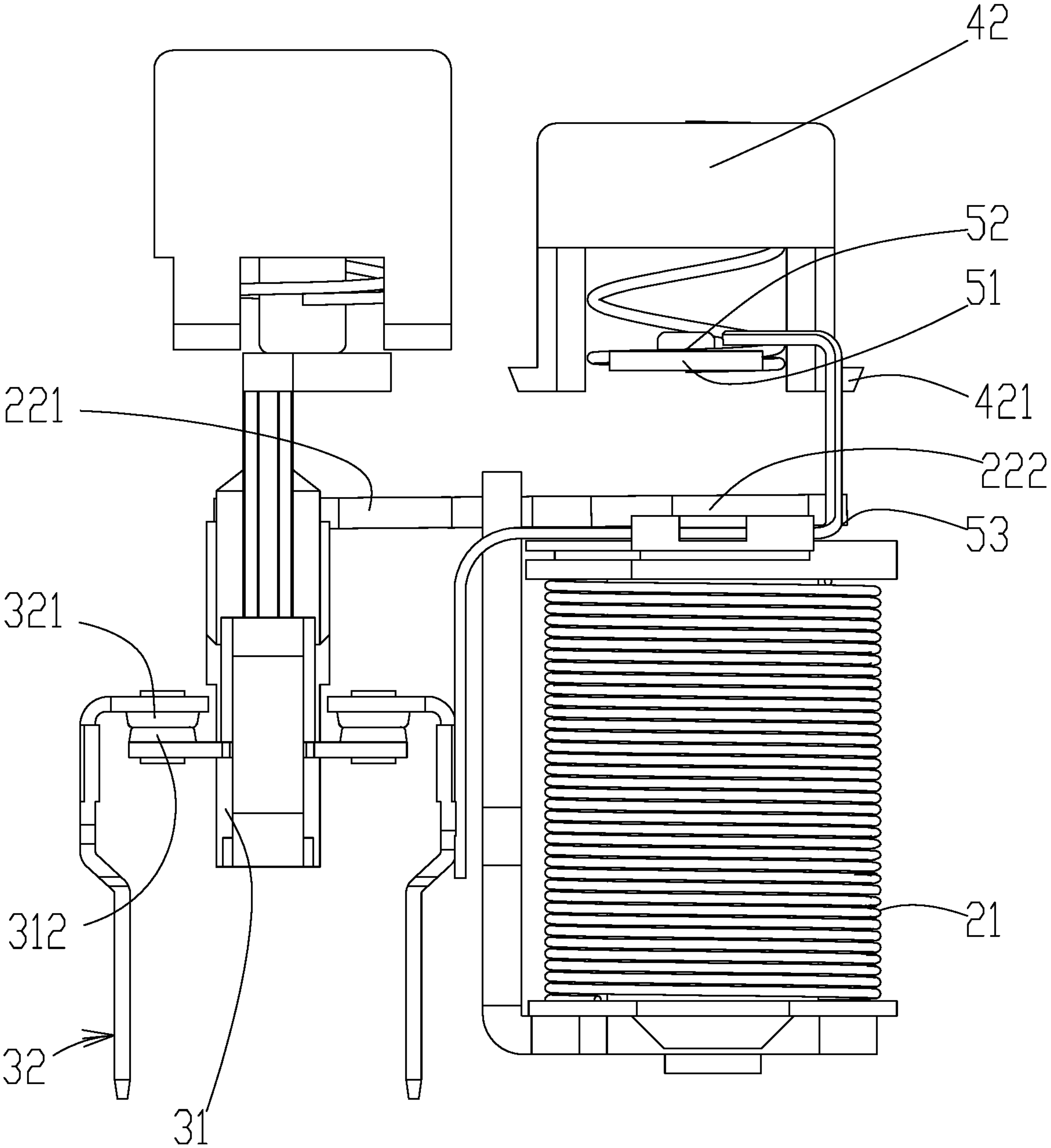
FIG. 4 is a schematic view of FIG. 1, illustrating a pivot space between the power-on button and the operating plate.

The above description relates to the various parts and assembly of the electromagnetic switch 100 provided by the preferred embodiment of the present invention. The use and characteristics of the present invention are described as follows:

When the present invention is to be in a power-on state, the power-on button 42 of the button unit 40 is pressed down, as shown in FIG. 3, so that the actuating plate 22 is pressed down by the slide pins 421 of the power-on button 42 to move from the disconnection position to the connection position. That is, the linking end 221 of the actuating plate 22 tilts up and synchronously drives the contact seat 31 to move upwards, such that the movable contacts 312 are in contact with the immovable contacts 321 for the electrode sheet assemblies 32 and the coil seat 21 to be connected. At this time, the magnetic end 222 of the actuating plate 22 is attracted by the electrified coil seat 21 and kept in a contact state, so as to keep in the power-on state. As shown in FIG. 4, after the power-on button 42 is pressed, the power-on button 42 is elastically pushed upwards and retuned by the power-on button spring 43, that is, there is a pivot space between the slide pins 421 of the power-on button 42 and the magnetic end 222 of the operating plate 22. If the power supply is not normal, the display light 50 does not have a normal power supply so that the light-emitting member 52 does not emit light. At this time, because the magnetic end 222 of the operating plate 22 is not magnetically attracted by the coil seat 21, so it is pivoted and returned to the state when it is not pressed, thereby reminding the operator to know that there is an abnormal power supply situation.

Figure 5:
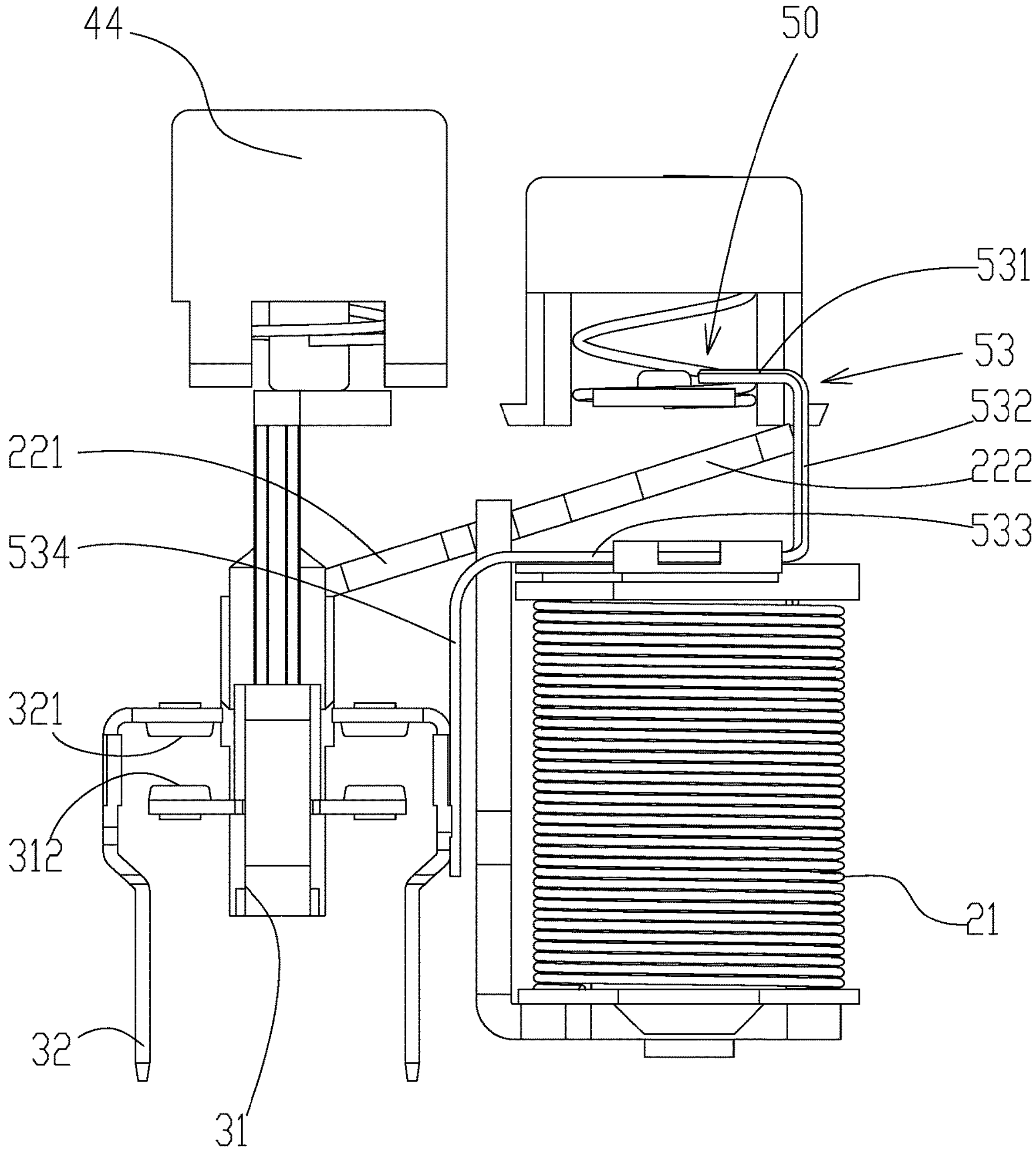
FIG. 5 is a schematic view of FIG. 1 in a power-off state.

When the present invention is to be in a power-off state, the power-off button 44 of the button unit 40 is pressed. As shown in FIG. 5, the power-off button 44 presses the contact seat 31 to move down, so that the movable contacts 312 are separated from the immovable contacts 321, and the actuating plate 22 is pressed down by the power-off button 44 to pivot from the connection position to the disconnection position. That is, the magnetic end 222 of the actuating plate 22 is no longer magnetically attracted by the coil seat 21 and tilts up to separate from the coil seat 21. When the contact seat 31 is moved down, the movable contacts 312 are separated from the immovable contacts 321, so that the electrode sheet assemblies 32 and the coil seat 21 are not connected, so as to keep the power-off state.

When the power-on button 42 is pressed, since the electrode sheet assemblies 32 are electrically connected to the coil seat 21, the electricity will be introduced into the circuit board 51 via the conductive wires 53, so that the light-emitting member 52 emits light continuously and the light passes through the power-on button 42. In this way, the operator can know that the electromagnetic switch (i.e., the machine) is in a power-on state via the light passing through the power-on button 42, so as to reduce the operator's misjudgment to avoid the possibility of danger.

In addition, in the above-mentioned embodiment, each of the conductive wires 53 of the display light 50 is integrally made, having a top flat section 531, a vertical middle section 532, a flat middle section 533 and a bottom vertical section 534 from top to bottom. The top flat section 531 is generally horizontal, and has one end connected to the circuit board 51. The vertical middle section 532 is generally vertical, and has one end connected to the other end of the top flat section 531. The flat middle section 533 is generally horizontal, and has one end connected to the other end of the vertical middle section 532. The bottom vertical section 534 is generally vertical, and has one end connected to the other end of the flat middle section 533. The other end of the bottom vertical section 534 is connected to the electrode sheet assemblies 32.

Figure 6:
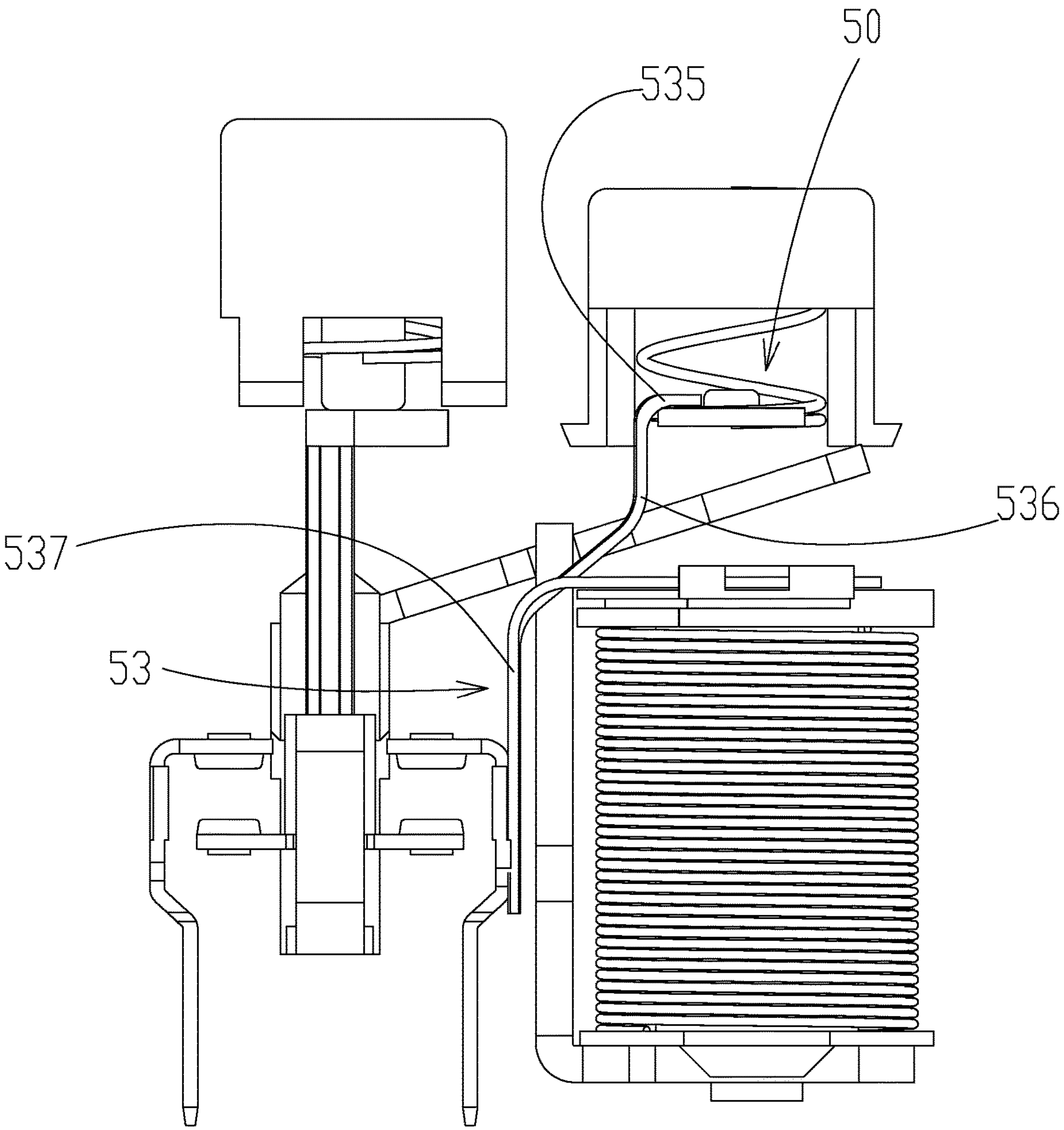
FIG. 6 is a schematic view of another embodiment of the present invention.

As shown in FIG. 6, in the above embodiment, each of the conductive wires 53 of the display light 50 is integrally made, having a top flat section 535, an oblique middle section 536, and a bottom vertical section 537 from top to bottom. The top flat section 535 is generally horizontal, and has one end connected to the circuit board 51. The oblique middle section 536 is generally inclined, and has one end connected to the other end of the top flat section 535. The bottom vertical section 537 is generally vertical, and has one end connected to the other end of the oblique middle section 536. The other end of the bottom vertical section 537 is connected to the electrode sheet assemblies 32.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An electromagnetic switch, comprising:

a housing, having an accommodating room with a hollow top;

an electromagnetic unit, including a coil seat and an actuating plate, the coil seat being disposed in the accommodating room, the actuating plate being pivotally connected to the coil seat, the actuating plate having a linking end and a magnetic end, the actuating plate being pivoted back and forth by an external force;

a contact unit, including a contact seat and at least two electrode sheet assemblies, the contact seat being disposed in the accommodating room, the contact seat having a plurality of movable contacts thereon, the electrode sheet assemblies being respectively located on two sides of the contact seat and extending out of a bottom of the housing, one of the electrode sheet assemblies communicating with the coil seat, the electrode sheet assemblies having a plurality of immovable contacts thereon, the contact seat being against the linking end of the operating plate and sliding up and down through the external force, wherein when the contact seat slides upwards, the movable contacts are in contact with the immovable contacts to turn on electricity; when the contact seat slides downwards, the movable contacts are separated from the immovable contacts to turn off electricity;

a button unit, including a top seat, a power-on button and a power-off button, the top seat being connected to the housing in a snap-fit manner, the power-on button being slidably connected to the top seat so that the power-on button slides up and down relative to the top seat, the power-off button being slidably connected to the top seat so that the power-off button slides up and down relative to the top seat; wherein when the power-on button is pressed, the contact seat is driven to move up; wherein when the power-off button is pressed, the contact seat is driven to move down;

a display light, including a circuit board, a light-emitting member and two conductive wires, the circuit board being fixedly connected to the top seat and located below the power-on button, the light-emitting member being disposed on the circuit board, the two conductive wires being connected between the circuit board and one of the electrode sheet assemblies, wherein the conductive wires each have a top flat section, a vertical middle section, a flat middle section and a bottom vertical section from top to bottom, the top flat section is generally horizontal and has one end connected to the circuit board, the vertical middle section is generally vertical and has one end connected to another end of the top flat section, the flat middle section is generally horizontal and has one end connected to another end of the vertical middle section, the bottom vertical section is generally vertical and has one end connected to another end of the flat middle section, and another end of the bottom vertical section is connected to the electrode sheet assemblies.

2. The electromagnetic switch as claimed in claim 1, wherein the contact seat has a through hole for insertion and contact of the linking end of the actuating plate.

3. The electromagnetic switch as claimed in claim 1, wherein the power-on button is located above the magnetic end of the actuating plate, and the power-off button is located above the contact seat.

4. The electromagnetic switch as claimed in claim 1, wherein the power-on button has two slide pins, and the slide pins are slidably connected to the top seat.

5. The electromagnetic switch as claimed in claim 1, wherein the power-off button has four slide pins, and the slide pins are slidably connected to the top seat.

6. The electromagnetic switch as claimed in claim 1, wherein the button unit further includes a power-on button spring, and the power-on button spring is connected between the top seat and the power-on button for providing an upward return elastic force to the power-on button so that the power-on button is returned and not pressed.

7. The electromagnetic switch as claimed in claim 1, wherein the button unit further includes a power-off button spring, and the power-off button spring is connected between the top seat and the power-off button for providing an upward return elastic force to the power-off button so that the power-off button is returned and not pressed.

8. The electromagnetic switch as claimed in claim 1, wherein the light-emitting member is a light-emitting diode.

9. An electromagnetic switch, comprising:

a housing, having an accommodating room with a hollow top;

an electromagnetic unit, including a coil seat and an actuating plate, the coil seat being disposed in the accommodating room, the actuating plate being pivotally connected to the coil seat, the actuating plate having a linking end and a magnetic end, the actuating plate being pivoted back and forth by an external force;

a contact unit, including a contact seat and at least two electrode sheet assemblies, the contact seat being disposed in the accommodating room, the contact seat having a plurality of movable contacts thereon, the electrode sheet assemblies being respectively located on two sides of the contact seat and extending out of a bottom of the housing, one of the electrode sheet assemblies communicating with the coil seat, the electrode sheet assemblies having a plurality of immovable contacts thereon, the contact seat being against the linking end of the operating plate and sliding up and down through the external force, wherein when the contact seat slides upwards, the movable contacts are in contact with the immovable contacts to turn on electricity; when the contact seat slides downwards, the movable contacts are separated from the immovable contacts to turn off electricity;

a button unit, including a top seat, a power-on button and a power-off button, the top seat being connected to the housing in a snap-fit manner, the power-on button being slidably connected to the top seat so that the power-on button slides up and down relative to the top seat, the power-off button being slidably connected to the top seat so that the power-off button slides up and down relative to the top seat; wherein when the power-on button is pressed, the contact seat is driven to move up; wherein when the power-off button is pressed, the contact seat is driven to move down;

a display light, including a circuit board, a light-emitting member and two conductive wires, the circuit board being fixedly connected to the top seat and located below the power-on button, the light-emitting member being disposed on the circuit board, the two conductive wires being connected between the circuit board and one of the electrode sheet assemblies, wherein the conductive wires each have a top flat section, an oblique middle section and a bottom vertical section from top to bottom, the top flat section is generally horizontal and has one end connected to the circuit board, the oblique middle section is generally inclined and has one end connected to another end of the top flat section, the bottom vertical section is generally vertical and has one end connected to another end of the oblique middle section, and another end of the bottom vertical section is connected to the electrode sheet assemblies.

10. The electromagnetic switch as claimed in claim 9, wherein the contact seat has a through hole for insertion and contact of the linking end of the actuating plate.

11. The electromagnetic switch as claimed in claim 9, wherein the power-on button is located above the magnetic end of the actuating plate, and the power-off button is located above the contact seat.

12. The electromagnetic switch as claimed in claim 9, wherein the power-on button has two slide pins, and the slide pins are slidably connected to the top seat.

13. The electromagnetic switch as claimed in claim 9, wherein the power-off button has four slide pins, and the slide pins are slidably connected to the top seat.

14. The electromagnetic switch as claimed in claim 9, wherein the button unit further includes a power-on button spring, and the power-on button spring is connected between the top seat and the power-on button for providing an upward return elastic force to the power-on button so that the power-on button is returned and not pressed.

15. The electromagnetic switch as claimed in claim 9, wherein the button unit further includes a power-off button spring, and the power-off button spring is connected between the top seat and the power-off button for providing an upward return elastic force to the power-off button so that the power-off button is returned and not pressed.

16. The electromagnetic switch as claimed in claim 9, wherein the light-emitting member is a light-emitting diode.

* * * * *